US006402223B2

(12) United States Patent
Ser et al.

(10) Patent No.: US 6,402,223 B2
(45) Date of Patent: Jun. 11, 2002

(54) ROOF DOOR OPENING AND CLOSING DEVICE FOR ROOF OPENING TYPE CONTAINER

(75) Inventors: Hee-Tae Ser, Kwangju-shi; Keun-Je Yang, Jeonju-shi, both of (KR)

(73) Assignees: Kia Motors Corporation, Seoul; Phinix R & D Co., Ltd., Kyonggi-do, both of (KR)

( * ) Notice: Subject to any disclaimer, the term of this patent is extended or adjusted under 35 U.S.C. 154(b) by 0 days.

(21) Appl. No.: 09/845,298

(22) Filed: May 1, 2001

(30) Foreign Application Priority Data

Jul. 18, 2000 (KR) ........................................... 00-41106

(51) Int. Cl.$^{7}$ .................................................. B60P 7/02

(52) U.S. Cl. ............... 296/100.08; 296/101; 296/100.1; 296/100.07

(58) Field of Search ......................... 296/100.08, 100.1, 296/100.06, 101, 100.07

(56) References Cited

U.S. PATENT DOCUMENTS

| | | | | |
|---|---|---|---|---|
| 316,536 A | * 4/1885 | Gage | | 296/101 |
| 1,158,138 A | * 10/1915 | Luedinghaus | | 296/101 |
| 1,333,464 A | * 3/1920 | Chrisotphersen | | 296/101 |
| 1,474,283 A | * 11/1923 | Nystrom et al. | | 296/100.08 |
| 2,166,846 A | * 7/1939 | McCalley | | 296/101 |
| 2,408,132 A | * 9/1946 | Weeks | | 296/100.1 |
| 2,739,658 A | * 11/1956 | Edmond | | 296/100.1 |
| 3,009,426 A | * 11/1961 | Nampa | | 296/100.1 |
| 3,995,890 A | * 12/1976 | Fletcher | | 296/100.1 |
| 4,268,084 A | * 5/1981 | Peters | | 296/100.1 |
| 4,302,044 A | * 11/1981 | Sims | | 296/100.1 |
| 4,627,658 A | * 12/1986 | Vold et al. | | 296/100.07 |
| 5,015,141 A | * 5/1991 | Ferrence | | 296/100.1 |
| 5,035,463 A | * 7/1991 | Kato et al. | | 296/146.11 |
| 5,056,859 A | * 10/1991 | Walder | | 296/100.1 |
| 5,190,341 A | * 3/1993 | Simard | | 296/100.1 |
| 5,373,665 A | * 12/1994 | Lyons, Sr. | | 49/386 |
| 5,690,377 A | * 11/1997 | Denyer | | 296/101 |
| 5,988,732 A | * 11/1999 | Schouten | | 296/100.1 |

FOREIGN PATENT DOCUMENTS

| | | |
|---|---|---|
| DE | 33000387 | * 7/1984 |
| FR | 2572342 | * 10/1984 |
| JP | 52 53324 | * 10/1975 |
| JP | 53 93520 | * 8/1978 |
| JP | 57 18531 | * 1/1982 |
| JP | 3 169780 | * 7/1991 |
| JP | 5 58163 | * 3/1993 |

* cited by examiner

*Primary Examiner*—Ken Patel
(74) *Attorney, Agent, or Firm*—Birch, Stewart, Kolasch & Birch, LLP

(57) ABSTRACT

Disclosed is a roof door opening and closing device for a roof opening type container. The device comprises a pair of roof doors provided to an upper end of a container body which has a box-shaped configuration, such that the roof doors can open and close the upper end of the container body; a pair of first links having one ends which are pivotably connected to a pair of driving shafts respectively arranged at both sides of the container body and the other ends which are pivotably connected to the roof doors; a pair of second links having one ends which are pivotably connected to two pairs of brackets each pair secured to the upper end of the container body between the driving shafts and the other ends which are pivotably connected to the roof doors; a reduction gear for velocity-reducing rotation force of a handle which is installed on the container body; a link mechanism for transferring the rotation force which is velocity-reduced by the reduction gear, to the pair of driving shafts which are respectively coupled with the pair of roof doors; and a plurality of springs installed on the pair of driving shafts and the two pairs of brackets such that spring force acts on the pair of driving shafts and the pair of second links when the pair of roof doors are completely opened or closed.

4 Claims, 3 Drawing Sheets

ROOF DOOR OPENING AND CLOSING DEVICE FOR ROOF OPENING TYPE CONTAINER

BACKGROUND OF THE INVENTION

Field of the Invention

The present invention relates to a roof opening door device, and more particularly, the present invention relates to a roof door opening and closing device for a roof opening type container used for loading freight, for example, industrial waste, which is to be transported in a closed state.

DESCRIPTION OF THE RELATED ART

Generally, when transporting special waste such as industrial waste, or home garbage, in order to prevent the waste or garbage from falling down onto road or the like, the waste and garbage are transported in a state wherein each of them is loaded in a roof opening type container which is capable of being opened and closed at its roof. This roof opening type container is placed on transportation means such as a special vehicle or a train.

Referring to FIG. 3, there is shown a schematic perspective view illustrating a conventional roof opening type container. As can be readily seen from FIG. 3, the conventional roof opening type container has a container body 101 which has a box-shaped configuration. A pair of roof doors 102 are provided to an upper end of the container body 101 in a manner such that they can be opened and closed. The pair of roof doors 102 are manually opened and closed by the medium of manipulation of a handle 103 which is arranged at a front end of the container body 101. When the pair of roof doors 102 are opened and closed by the medium of the manipulation of the handle 103, a reduction gear 105 which is disposed so as to reduce an opening and closing velocity of the pair of roof doors 102, is actuated by continuous rotation of the handle 103. The reduction gear 105 transfers power which is generated by the rotation of the handle 103, through a first chain 104 and a second chain 106 to a pair of gear boxes 112, so that a velocity is reduced.

The pair of gear boxes 112 respectively rotate a pair of driving shafts 109 which extend in a forward and rearward direction at both sides of the container body 101. Each roof door 102 is secured at one widthwise end thereof to each driving shaft 109. The pair of roof doors 102 are rotated about the pair of driving shafts 109 by the medium of rotation of the pair of driving shafts 109 in a manner such that they open or close the upper end of the container body 101.

However, the conventional roof opening type container constructed as mentioned above suffers from defects in that, since power for opening and closing the pair of roof doors 102 is transferred from the handle 103 through the reduction gear 105, the first and second chains 104 and 106 and the pair of driving shafts 109 to the pair of roof doors 102, when the pair of roof doors 102 are initially opened or closed, a great deal of effort is required, and thereby the opening and closing velocity of the pair of roof doors 102 cannot but be slowed. For example, in order to open or close the pair of roof doors 102 through 270°, while being influenced by a diameter of sprockets which are connected with the first and second chains 104 and 106, the handle 103 must be rotated by about fifty-three revolutions.

Also, when the pair of roof doors 102 are opened and closed, as the center of gravity of each roof door 102 continuously moves, a play is developed in each of the first and second chains 104 and 106, whereby durability of the entire container can be impaired. Moreover, because a sudden roof door sagging phenomenon may be induced due to a self-weight of each roof door 2, the likelihood of an accident to occur is increased.

SUMMARY OF THE INVENTION

Accordingly, the present invention has been made in an effort to solve the problems occurring in the related art, and an object of the present invention is to provide a roof door opening and closing device for a roof opening type container, which enables a pair of roof doors to be easily and quickly opened and closed, improves safety upon opening and closing of the roof doors, and enhances durability of the roof doors.

In order to achieve the above object, according to one aspect of the present invention, there is provided a roof door opening and closing device for a roof opening type container, comprising: a pair of roof doors provided to an upper end of a container body which has a box-shaped configuration, in a manner such that the pair of roof doors can open and close the upper end of the container body; a pair of first links having one ends which are pivotably connected to a pair of driving shafts respectively arranged at both sides of the container body and the other ends which are pivotably connected to the pair of roof doors; a pair of second links having one ends which are pivotably connected to two pairs of brackets each pair secured to the upper end of the container body between the pair of driving shafts and the other ends which are pivotably connected to the pair of roof doors; a reduction gear for velocity-reducing rotation force of a handle which is installed on the container body; a link mechanism for transferring the rotation force which is velocity-reduced by the reduction gear, to the pair of driving shafts which are respectively coupled with the pair of roof doors; and a plurality of springs installed on the pair of driving shafts and the two pairs of brackets in a manner such that spring force acts on the pair of driving shafts and the pair of second links when the pair of roof doors are completely opened or closed.

According to another aspect of the present invention, the link mechanism comprises a first chain which is located between the handle and the reduction gear so as to transfer the rotation force of the handle to the reduction gear, a second chain which is located between the reduction gear and the pair of driving shafts so as to transfer the rotation force velocity-reduced by the reduction gear, to the pair of driving shafts, and a pair of connection shafts which respectively connect the pair of driving shafts to the second chain.

According to still another aspect of the present invention, each of the pair of connection shafts and each of the pair of driving shafts are connected with each other by virtue of a pair of gears.

According to yet still another aspect of the present invention, the plurality of springs are installed on the pair of driving shafts and the two pairs of brackets in a manner such that the plurality of springs are freed and thereby the spring force does not act on the pair of driving shafts and the pair of second links when the pair of roof doors are opened by 270°.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Figure 1:
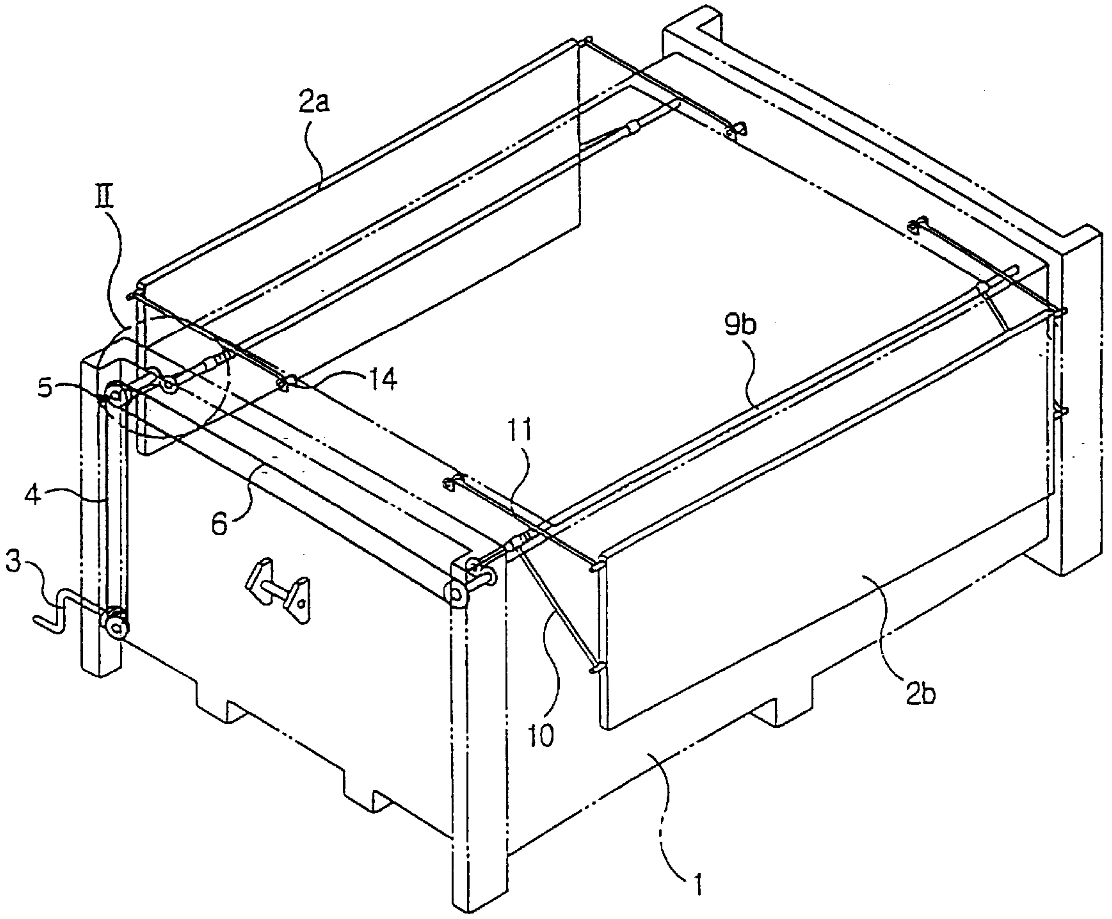
FIG. 1 is a perspective view schematically illustrating an opening and closing structure for a roof door of a roof opening type container in accordance with an embodiment of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 is a perspective view schematically illustrating an opening and closing structure for a roof door of a roof opening type container in accordance with an embodiment of the present invention. As shown in FIG. 1, the roof opening type container has a container body 1 which has a box-shaped configuration. A pair of roof doors 2*a* and 2*b* cooperatively define a roof of the container body 1. The pair of roof doors 2*a* and 2*b* are opened and closed by rotating manipulation of a handle 3 which is arranged at a side of a front end of the container body 1. A first chain 4 which extends in a vertical direction, is connected to the handle 3. The first chain 4 is also connected with a first gear 7*a* which is provided at a front end of a connection shaft 7 which is positioned at an upper end of the container body 1. As can be readily seen from FIG. 2, on the front end of the connection shaft 7, there are installed the first gear 7*a* to which the first chain 4 is connected and a second gear 7*b* which has a larger diameter than the first gear 7*a*. The first gear 7*a* and the second gear 7*b* constitute a reduction gear 5 which functions to reduce a rotational velocity of the handle 3 and then transfer reduced rotational velocity to the connection shaft 7.

Figure 2:
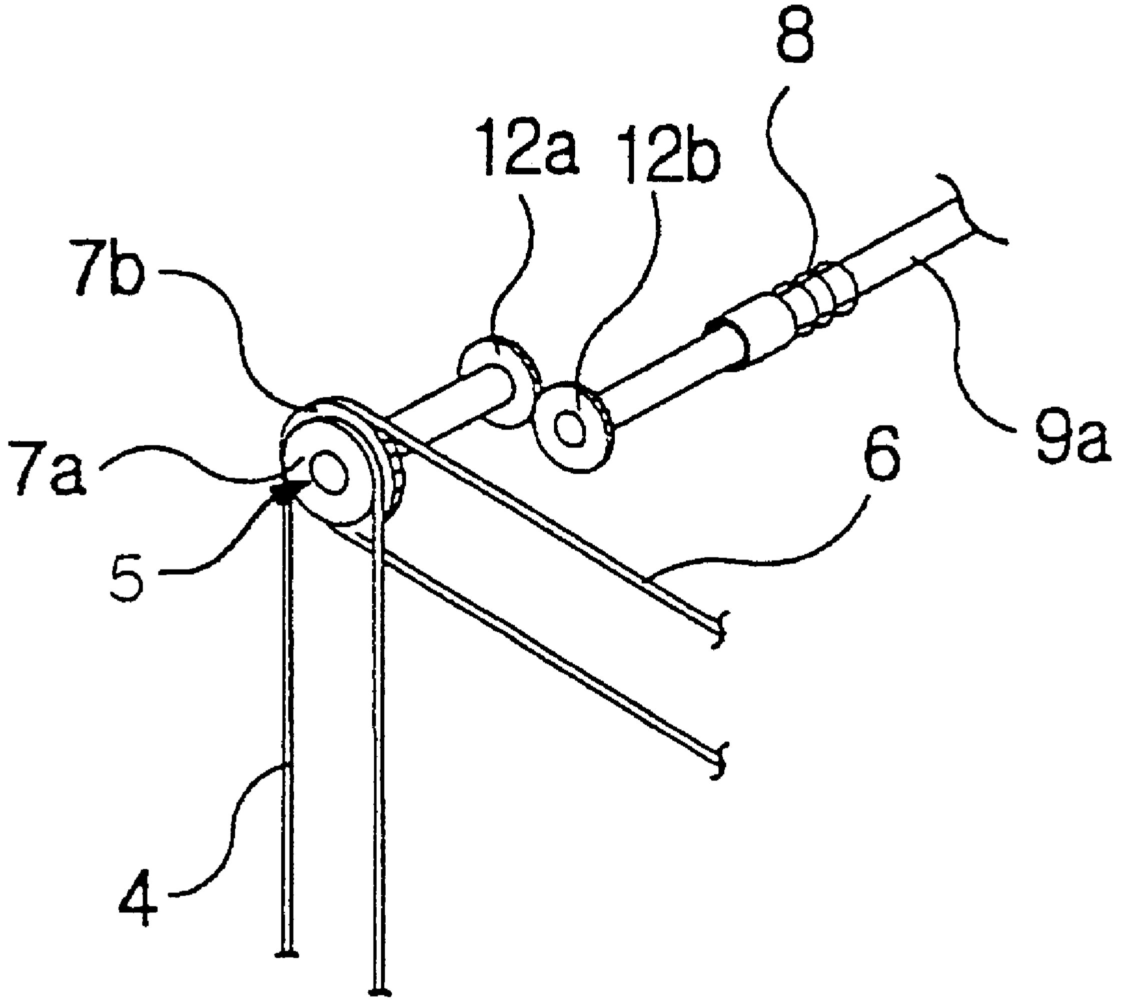
FIG. 2 is an enlarged perspective view for the II part of FIG. 1.
Figure 3:
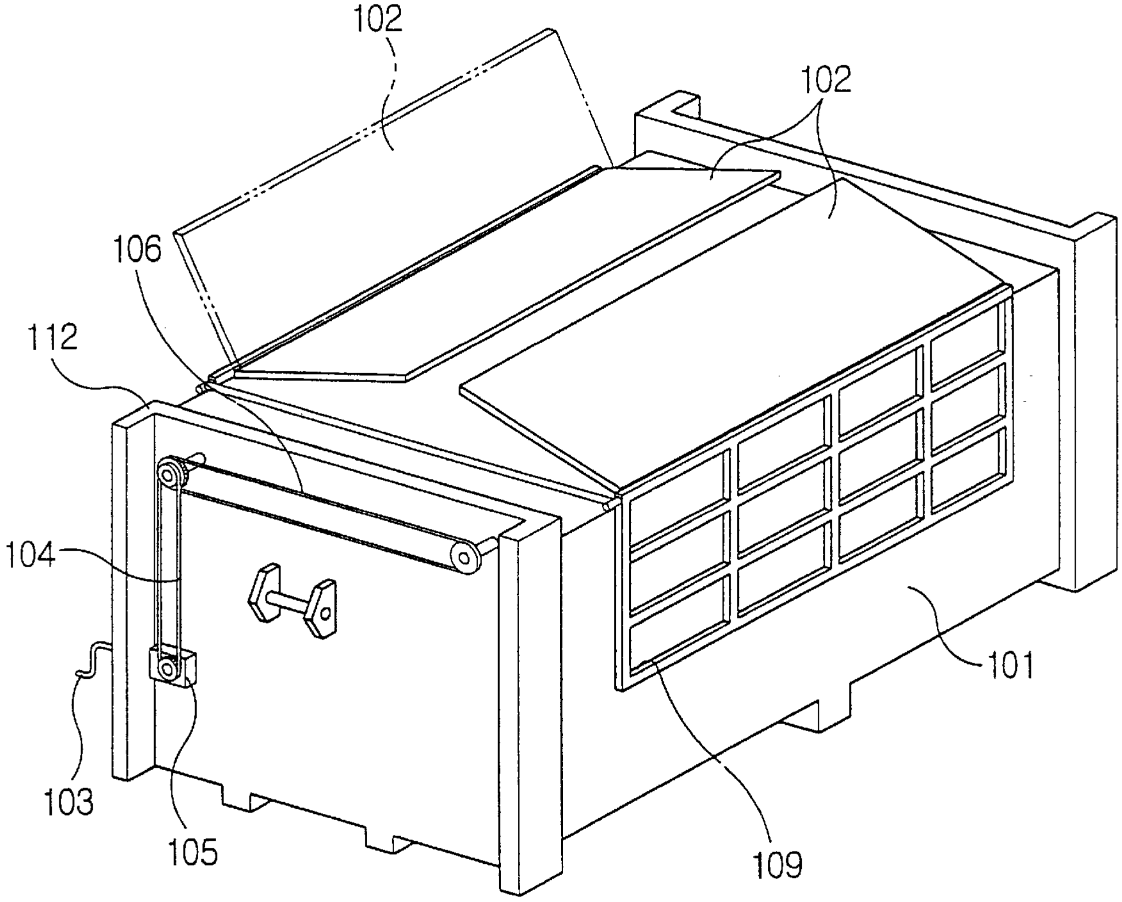
FIG. 3 is a schematic perspective view illustrating a conventional roof opening type container.

Therefore, the first chain 4 is connected with the reduction gear 5 and thereby connected to a first driving shaft 9*a* which functions to drive a first roof door 2*a*. The connection shaft 7 transfers rotation force of the handle 3 through a second chain 6 which is installed on the second gear 7*b*, to a second driving shaft 9*b* which functions to drive a second roof door 2*b*. As best shown in FIG. 2, the connection shaft 7 and the pair of driving shafts 9*a* and 9*b* are connected with each other through a first gear 12*a* which is installed on the connection shaft 7 and a second gear 12*b* which is installed on each of the pair of driving shafts 9*a* and 9*b*. This is because the pair of roof doors 2*a* and 2*b* are opened and closed in opposite directions from each other. Also, the driving shaft 9*a* or 9*b* which is provided to any one of the pair of roof doors 2*a* and 2*b*, can be directly connected to the connection shaft 7.

As described above, the reduction gear 5 includes the first gear 7*a* which is connected with the first chain 4 and the second gear 7*b* on which the second chain 6 connected to the driving shafts 9*a* and 9*b* so as to transfer power of the handle 3 to the driving shafts 9*a* and 9*b* is installed. Since the first gear 7*a* is smaller than the second gear 7*b*, the driving shafts 9*a* and 9*b* are rotated at a velocity which is slower than that of the connection shaft 7.

A first link 10 is fixedly installed on each of the driving shafts 9*a* and 9*b*. That is to say, one ends of a pair of first links 10 are pivotably connected to the pair of driving shafts 9*a* and 9*b*, respectively, and the other ends of the pair of first links 10 are pivotably connected to middle portions of the pair of roof doors 2*a* and 2*b*, respectively. Further, the roof doors 2*a* and 2*b* are, as shown in FIG. 2, connected to an upper surface of the container body 1 through a pair of second links 11. That is to say, one end of each second link 11 is pivotably connected to a pair of brackets 14 which are secured to the upper surface of the container body 1 between the pair of driving shafts 9*a* and 9*b*, and the other end of each second link 11 is pivotably connected to each of the pair of roof doors 2*a* and 2*b*.

Springs 8 which are installed on the pair of driving shafts 9*a* and 9*b* as shown in FIG. 2 and springs (not shown) which are installed on the brackets 14, act spring force on the first and second links 10 and 11. These springs are installed on the driving shafts 9*a* and 9*b* and the brackets 14 in a manner such that the springs are freed, that is, spring force of the springs does not act in any directions when the pair of roof doors 2*a* and 2*b* are opened by about 270°. Accordingly, when the pair of roof doors 2*a* and 2*b* are completely opened or closed, spring force of the springs acts on the driving shafts 9*a* and 9*b* and the brackets 14 in directions in which the pair of roof doors 2*a* and 2*b* are to be opened or closed.

Accordingly, in a state wherein the pair of roof doors 2*a* and 2*b* are completely opened or closed, when the handle 3 is rotated so as to open or close the pair of roof doors 2*a* and 2*b*, as the spring force of the springs which are installed on the driving shafts 9*a* and 9*b* and the brackets 14, acts on the first and second links 10 and 11 in the directions in which the pair of roof doors 2*a* and 2*b* are opened or closed, force which is required for opening and closing the pair of roof doors 2*a* and 2*b*, can be effectively decreased.

By the fact that the roof door opening and closing device for a roof opening type container according to the present invention is constructed as mentioned above, if the handle 3 is rotated in a left or right direction, rotation force of the handle 3 is transferred to the connection shaft 7 through the first chain 4. By this, the second chain 6 which is connected to the second gear 7*b* which is installed on the connection shaft 7, is driven. As described above, the connection shaft 7 is connected to the reduction gear 5 which is connected with the first driving shaft 9*a*, and the second chain 6 is connected to the second driving shaft 9*b*. Thus, the pair of driving shafts 9*a* and 9*b* are rotated by the rotation of the handle 3 so that they open or close the pair of roof doors 2*a* and 2*b*.

As described above, the pair of roof doors 2*a* and 2*b* are connected to the driving shafts 9*a* and 9*b* and the upper surface of the container body 1 through the first and second links 10 and 11. By the fact that one ends of the first links 10 are pivotally connected to the pair of driving shafts 9*a* and 9*b* and the other ends of the first links 10 are pivotably connected to the middle portions of the pair of roof doors 2*a* and 2*b*, the pair of roof doors 2*a* and 2*b* are raised upward by rotation of the driving shafts 9*a* and 9*b*. At this time, the second links 11 which have one ends pivotably connected to the two pairs of brackets 14 and the other ends pivotably connected to the pair of roof doors 2*a* and 2*b*, are pivoted about the brackets 14 by rotational movement of the roof doors 2*a* and 2*b*.

At this time, the pair of roof doors 2*a* and 2*b* can be easily opened or closed by the aid of the springs which are mounted to the driving shafts 9*a* and 9*b* and the brackets 14. After the pair of roof doors 2*a* and 2*b* are opened to a predetermined height, as the pair of roof doors 2*a* and 2*b* are lowered by their self-weight, the pair of roof doors 2*a* and

2*b* are completely opened or closed. As a consequence, due to the fact that the springs which are installed on the driving shafts 9*a* and 9*b* and the brackets 14, acts on the first and second links 10 and 11, force which is required for opening or closing the roof doors 2*a* and 2*b*, can be minimized.

As a result, the roof door opening and closing device for a roof opening type container according to the present invention, constructed as aforementioned above, provides advantages in that, since opening and closing of a pair of roof doors is aided by spring force, it is possible to easily and quickly open and close the pair of roof doors. Also, due to the fact that it is possible to prevent a play from being developed in a chain due to continuous movement of the center of gravity in each roof door, durability of the entire roof door opening and closing device can be enhanced. Further, because a sudden roof door sagging phenomenon due to a self-weight of each roof door can be avoided, the likelihood of an accident to occur is decreased.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A roof door opening and closing device for a roof opening type container, comprising:

a pair of roof doors provided to an upper end of a container body which has a box-shaped configuration, in a manner such that the pair of roof doors can open and close the upper end of the container body;

a pair of first links having one ends which are pivotably connected to a pair of driving shafts respectively arranged at both sides of the container body and the other ends which are pivotably connected to the pair of roof doors;

a pair of second links having one ends which are pivotably connected to two pairs of brackets each pair secured to the upper end of the container body between the pair of driving shafts and the other ends which are pivotably connected to the pair of roof doors;

a reduction gear for velocity-reducing rotation force of a handle which is installed on the container body;

a link mechanism for transferring the rotation force which is velocity-reduced by the reduction gear, to the pair of driving shafts which are respectively coupled with the pair of roof doors; and a plurality of springs installed on the pair of driving shafts and the two pairs of brackets in a manner such that spring force acts on the pair of driving shafts and the pair of second links when the pair of roof doors are completely opened or closed.

2. The roof door opening and closing device as claimed in claim 1, wherein the link mechanism comprises a first chain which is located between the handle and the reduction gear so as to transfer the rotation force of the handle to the reduction gear, a second chain which is located between the reduction gear and the pair of driving shafts so as to transfer the rotation force velocity-reduced by the reduction gear, to the pair of driving shafts, and a pair of connection shafts which respectively connect the pair of driving shafts to the second chain.

3. The roof door opening and closing device as claimed in claim 2, wherein each of the pair of connection shafts and each of the pair of driving shafts are connected with each other by virtue of a pair of gears.

4. The roof door opening and closing device as claimed in claim 1, wherein the plurality of springs are installed on the pair of driving shafts and the two pairs of brackets in a manner such that the plurality of springs are freed and thereby the spring force does not act on the pair of driving shafts and the pair of second links when the pair of roof doors are opened by 270°.

* * * * *